(12) United States Patent
Parker et al.

(10) Patent No.: US 7,000,665 B2
(45) Date of Patent: Feb. 21, 2006

(54) STACKING APPARATUS AND METHOD FOR ASSEMBLY OF POLYMER BATTERIES

(75) Inventors: Michael Parker, Ste-Julie (CA); Gilles Gagnon, Repentigny (CA)

(73) Assignee: Avestor Limited Partnership, Boucherville (CA)

( * ) Notice: Subject to any disclaimer, the term of this patent is extended or adjusted under 35 U.S.C. 154(b) by 18 days.

(21) Appl. No.: 10/666,045

(22) Filed: Sep. 22, 2003

(65) Prior Publication Data

US 2005/0061426 A1 Mar. 24, 2005

Related U.S. Application Data

(63) Continuation of application No. PCT/CA03/01489, filed on Sep. 18, 2003.

(51) Int. Cl.
*B32B 31/00* (2006.01)

(52) U.S. Cl. .................. 156/443; 156/264; 156/512; 156/517; 156/558; 156/563; 270/52.12; 270/58.01; 279/58.01

(58) Field of Classification Search ............... 156/87, 156/512, 517, 558, 563, 443, 264, 289; 270/52.12, 270/58.28; 279/58.01
See application file for complete search history.

(56) References Cited

U.S. PATENT DOCUMENTS

| | | | |
|---|---|---|---|
| 5,100,746 | A | 3/1992 | Muller et al. |
| 6,030,421 | A | 2/2000 | Gauthier et al. |
| 6,547,229 | B1 | 4/2003 | Hanson et al. |
| 6,585,846 | B1 | 7/2003 | Hanson et al. |
| 2003/0099878 | A1 | 5/2003 | Kramlich et al. |

FOREIGN PATENT DOCUMENTS

| | | |
|---|---|---|
| WO | WO 97/31400 A | 8/1997 |
| WO | WO 99/34466 A | 7/1999 |
| WO | WO 02/42191 A | 5/2002 |
| WO | WO 02/43179 A | 5/2002 |

*Primary Examiner*—Linda Gray

(57) ABSTRACT

A stacking apparatus and a method for assembly of electrochemical cells. The stacking apparatus includes at least one stacking head having an adjustable holding member adapted to hold an electrochemical laminate of a pre-determined length and means for adjusting the shape of the electrochemical laminate of the pre-determined length during stacking of a plurality of electrochemical laminates. The electrochemical laminates are assembled in a way that prevents air entrapment between the electrochemical laminates.

12 Claims, 4 Drawing Sheets

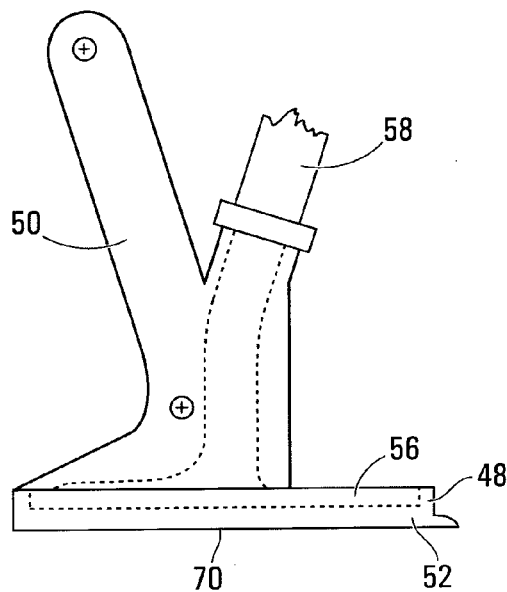
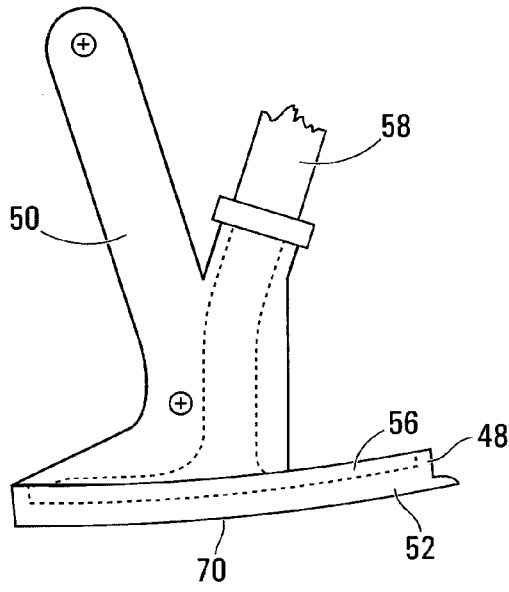
FIG. 5A  FIG. 5B
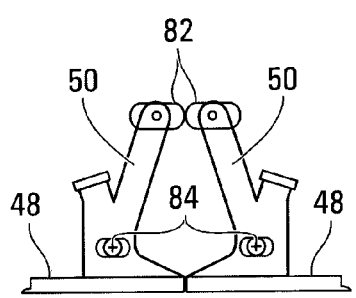
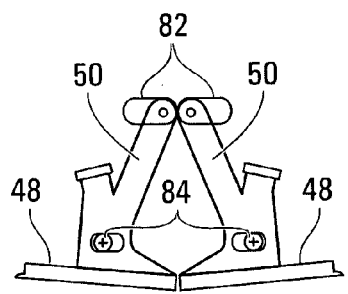
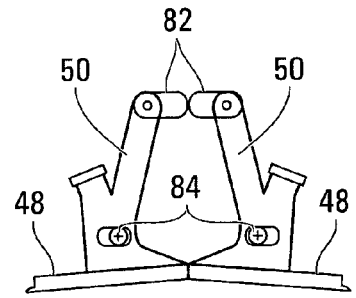
FIG. 6A  FIG. 6B  FIG. 6C

STACKING APPARATUS AND METHOD FOR ASSEMBLY OF POLYMER BATTERIES

CROSS REFERENCE TO RELATED APPLICATION

The present application claims priority under 35 U.S.C. 120 from international PCT Application No. PCT/CA2003/001480 filed on Sep. 18, 2003 by Parker et al. and designating the United States of America.

FIELD OF THE INVENTION

The present invention relates generally to the manufacturing of polymer batteries and more specifically to an apparatus and method for stacking polymer electrochemical laminates to form polymer electrochemical cells that are constituents of a polymer battery.

BACKGROUND OF THE INVENTION

Rechargeable batteries manufactured from laminates of solid polymer electrolytes and sheet-like anodes and cathodes display many advantages over conventional liquid electrolyte batteries. These advantages include lower overall battery weight, high power density, high specific energy, longer service life, as well as being environmentally friendly since the danger of spilling toxic liquid into the environment is eliminated.

Solid polymer electrochemical cell components include positive electrodes, negative electrodes and a separator material capable of permitting ionic conductivity such as a solid polymer electrolyte sandwiched between each anode and cathode. The anodes (or negative electrodes) and cathodes (or positive electrodes) are made of material capable of reversibly intercalating alkali metal ions.

Such an advanced battery system typically consists of a series of extremely thin film laminates of anode material, polymer electrolyte separator, cathode material and current collector assembled together as a multi-layer construction in either a flat roll configuration, a jelly roll configuration or a flat stack configuration to form a battery. Individual electrochemical laminates are typically mono-face or bi-face. A mono-face electrochemical laminate consists of a current collector, a cathode, a polymer electrolyte separator, and an anode covered with an insulating polypropylene film to insulate the electrochemical laminate from the adjacent one for preventing short circuits. A bi-face electrochemical laminate consists of a central current collector having a cathode layer on both sides, a polymer electrolyte separator adjacent each cathode layer, and an anode layer adjacent each electrolyte separator. In a bi-face laminate, the insulating polypropylene film is eliminated since the risk of short-circuits between the anode and the cathode of adjacent laminates is removed. A bi-face laminate assembly typically provides a higher energy density.

For large batteries (500 gr or more), the preferred configuration is a flat stacked multi-layer assembly of bi-face laminate for its high energy density and for its ability to be shaped into a limited volume.

Numerous methods of assembling laminates into cells and batteries have been devised and/or investigated. U.S. Pat. No. 5,100,746 discloses a method of assembling the anode, cathode, current collector and electrolyte separator layers are co-laminated using a series of pressure rollers, the assembly thereafter being coiled to form a battery; however, the assembly could be cut and stacked.

U.S. Pat. No. 6,030,421 discloses a previously laminated mother-battery containing an anode of metallic lithium or sodium, a composite cathode, a polymer electrolyte that acts as a separator between the electrodes, and a current collector. The laminated mother-battery is thereafter subjected to a sharp mechanical cutting out to give thin polymer electrolyte batteries.

These documents disclose how to assemble the laminates themselves but do not teach precisely how to properly superpose or flat-stack the laminates to form batteries.

U.S. Pat. No. 6,547,229 discloses a stacking apparatus and method employing one or more stations, each including a stationary stacking platform or a conveyor upon which spaced-apart pucks are coupled for travel thereon. A product delivery apparatus drives one or more movable webs to which segmented product sheets are removably affixed. The product delivery apparatus includes one or more rotatable lamination interfaces associated with each of the stations for transferring product sheets from the webs to the pucks on a repetitive basis to produce a stack of product sheets on the respective pucks. Each of the segmented product sheets may define all or a portion of an electrochemical cell, the latter including layers of film or sheet material, wherein a portion of each of the layers is provided with a bonding feature. A puck need not be in motion during the transfer of the product sheet from the lamination roll to the puck. The puck may or may not be attached to a conveyor, but the conveyor need not be in motion during the lamination or stack building process. In this case, a roller is moved across the puck and simultaneously rotated so a point on the surface of the roller interfaces with the puck at the same location on each pass.

WO 02/43179 discloses an apparatus and method for rotatably cutting and/or laminating layered structures or sheet material supported by webs. A rotary converting apparatus and method converts a web comprising a cathode layered structure and a web comprising an anode layered structure into a series of layered electrochemical cell structures supported by a release liner. Employment of a rotary converting process provides for the creation of a product having a finished size, without need for downstream or subsequent cutting.

These two documents disclose methods of stacking components of laminates using a rotary device. This type of rotating mechanism is however often unreliable to produce precise assembly.

There are numerous difficulties to overcome when stacking extremely thin sheets together to produce electrochemical cells. First, each layer must be precisely aligned with the other layers in order to have a properly assembled stack that can be electrically connected with ease and within which no electrical short circuit will occur due to misalignment of the plurality of layers. A rotary system is inherently unable to provide the precise stacking of each layer required for electrochemical cell assembly. Secondly, when stacking the various layers of the electrochemical cell together, it is imperative that air not be trapped between two layers. Air entrapment will prevent proper contact between the various layers thereby reducing the capacity of the electrochemical cell as well as creating uneven surfaces that may cause further problems in subsequent assembly steps. Thirdly, the components, i.e. thin films of cathode, anode and electrolyte separator, are sticky and are difficult to handle without ripping or corrupting.

Thus there is a need in the polymer battery industry for an efficient method and apparatus for stacking polymer electrochemical laminates and constituents thereof to form polymer electrochemical cells and batteries.

STATEMENT OF THE INVENTION

It is therefore an object of the present invention to provide a stacking apparatus for assembly of electrochemical cells comprising:
 a supporting structure;
 at least one stacking head having an adjustable holding member adapted to hold an electrochemical laminate of a pre-determined length and having means for adjusting the shape of the electrochemical laminate;
 the stacking head being operative to stack a plurality of electrochemical laminates of the pre-determined length one on top of the other, during stacking the adjustable holding member holding each particular electrochemical laminate of the pre-determined length in a shape such that a central portion of the particular electrochemical laminate of the pre-determined length is deposited first, followed by a motion of the adjustable holding member that progressively lowers the remainder of the particular electrochemical laminate of the pre-determined length, thereby preventing air entrapment between adjacent electrochemical laminates of the pre-determined length in the stack.

Advantageously, the adjustable holding member comprises a substantially flat plate made of a micro-porous material through which a vacuum system generates a negative pressure that holds the pre-determined length of electrochemical laminate.

As embodied and broadly described, the invention further provides a process for assembling a plurality of electrochemical laminates to form a battery comprising the steps of:
 laminating a continuous length of anode film with a continuous length of pre-assembled half cell comprising a current collector, a cathode film and an electrolyte separator film;
 cutting the laminate into pre-determined lengths of laminates;
 stacking the pre-determined lengths of laminates one on top of the other in a shape such that a central portion of each pre-determined length of laminate is deposited first, followed by a motion that lowers the remainder of the pre-determined length of laminate, thereby preventing air entrapment between adjacent pre-determined lengths of laminate in the stack.

As embodied and broadly described, the invention also provides a process for assembling a plurality of electrochemical laminates to form a battery wherein the electrochemical laminates are in a charged state when being assembled one above the other.

BRIEF DESCRIPTION OF THE DRAWINGS

The invention will be better understood and other advantages will appear by means of the following description and the following drawings in which:

FIGS. 5A and 5B are enlarged schematic front elevational views of two embodiments of a component of the stacking apparatus according to the invention; and FIGS. 6a, 6b and 6c illustrate schematic front elevational views of three different positions assumed by the component illustrated in FIG. 5A throughout one assembly cycle of the assembly process according to the invention;

DETAILED DESCRIPTION

Figure 1:
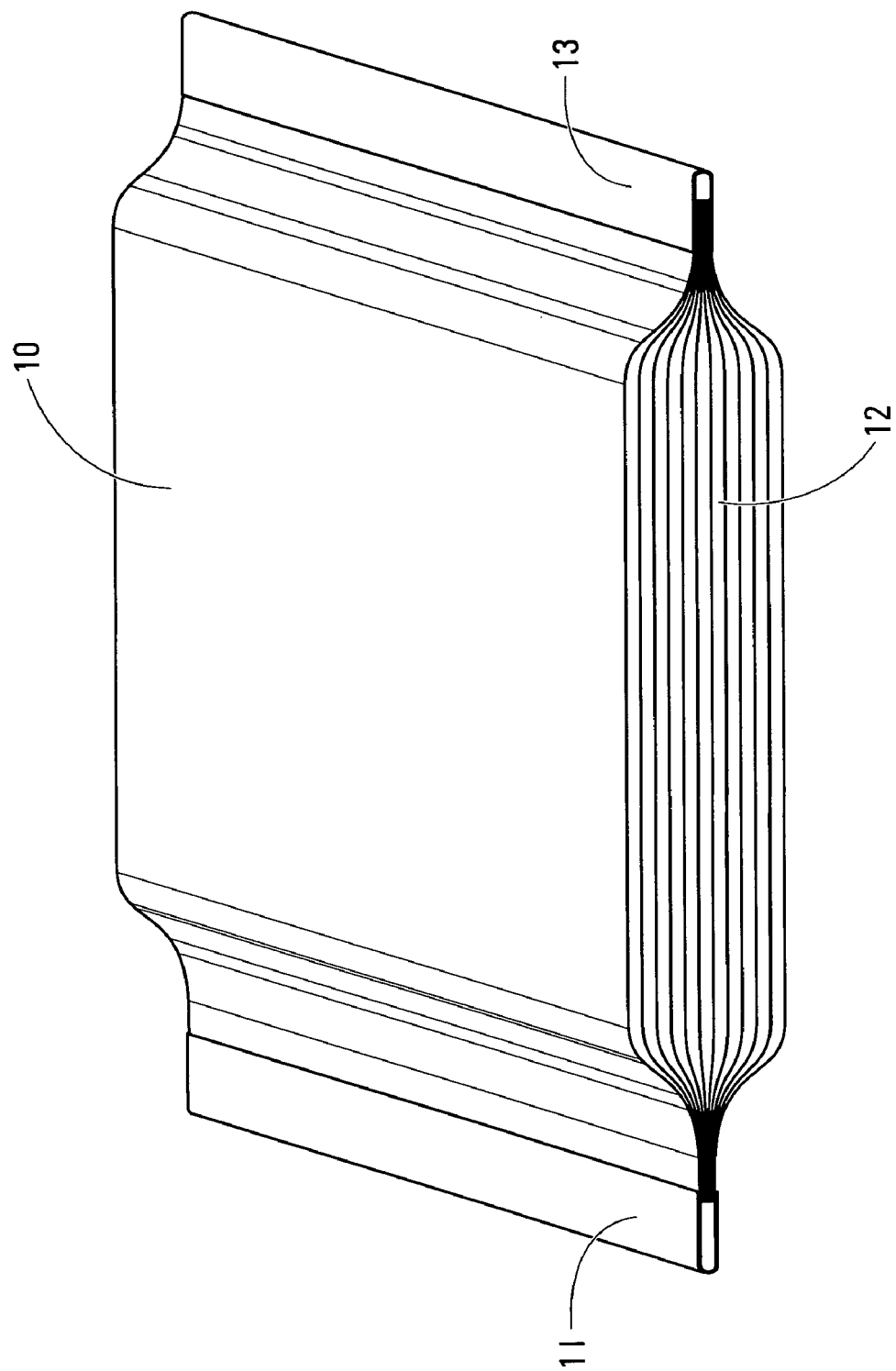
FIG. 1 is a partial perspective view of a plurality of stacked electrochemical laminates forming an electrochemical cell according to one embodiment of the invention.
Figure 2:
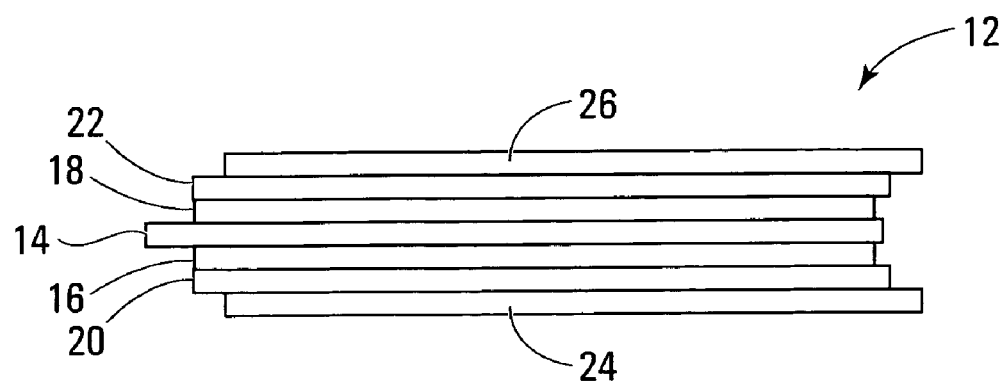
FIG. 2 is a schematic cross-sectional view of a bi-face electrochemical laminate according to one embodiment of the invention.

In FIG. 1, there is shown for illustrative purposes a specific embodiment of a Lithium polymer electrochemical cell 10 comprising a prismatic assembly of a plurality of electrochemical laminates 12 stacked together. With reference to FIG. 2, in a preferred configuration, each individual electrochemical laminate 12 comprises a central cathode current collector 14, a cathode film 16 and 18 layered on both sides of cathode current collector 14, a polymer electrolyte separator film 20 and 22 layered over each cathode film 16 and 18, and an anode thin sheet 24 and 26 layered over each polymer electrolyte separator film 20 and 22, which together form a bi-face electrochemical laminate 12. As shown in FIG. 2, the anode sheets 24 and 26 are offset relative to the central current collector 14 such that the cathode current collector 14 extends on one side of the electrochemical laminate 12 and the anode thin sheets 24 and 26 extend on the opposite side of the electrochemical laminate 12. When a plurality of laminates 12 are stacked together, the anode sheets of all laminates 12 may be electrically connected together on one side 13 of the electrochemical cell 10 and the cathode current collectors 14 of all laminates 12 may be electrically connected together on the opposite side 11 of the electrochemical cell 10 as shown in FIG. 1. Each electrochemical laminate 12 generally has a thickness in the range of 80 to 300 microns.

Figure 3:
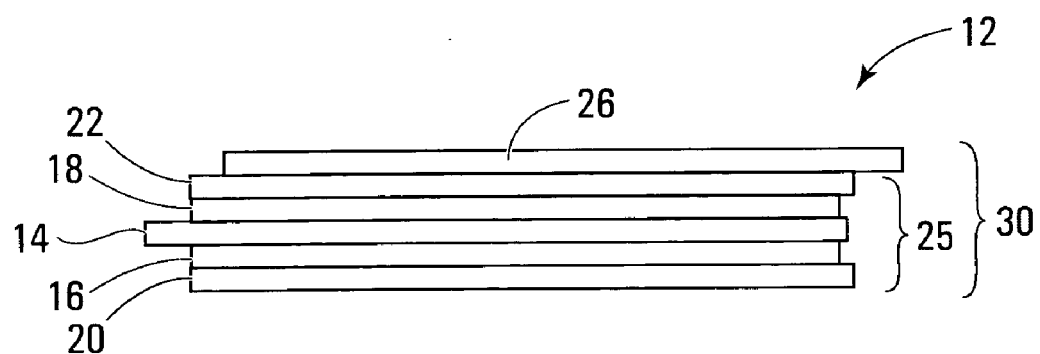
FIG. 3 is a schematic cross-sectional view of a pre-assembly of an electrochemical laminate according to one embodiment of the invention.

In order to efficiently assemble electrochemical cell 10, the central portion of the electrochemical laminate 12 is first assembled. Cathode films 16 and 18 are applied on both sides of a continuous length of current collector sheet or foil 14 which is typically a metal foil, such as an aluminum foil, to form a continuous length of cathode films coated on both sides of current collector 14. Subsequently, polymer electrolyte separator films 20 and 22 are layered over each continuous length of cathode films 16 and 18 to form the core or half-cell 25 of laminate 12. Hereafter, an anode thin sheet 26 is applied to only one side of half-cell 25 of laminate 12 as illustrated in FIG. 3 to form a pre-assembly 30 of laminate 12. The pre-assembly 30 therefore consists of a continuous length comprising a central cathode current collector 14 having a layer of cathode material 16 and 18 on each side thereof, each cathode layer 16 and 18 being covered by polymer electrolyte separator films 20 and 22, and one anode sheet 26 on one side of pre-assembly 30. By continuous lengths, we understand long lengths of materials extending from a few meters in length to hundreds of meters in length.

The continuous length of pre-assembly 30 is then brought to a stacking apparatus where it is cut in appropriate lengths ranging from 10 cm to 80 cm depending on the electrochemical cell configuration and thereafter stacked one on top of each other to form an electrochemical cell 10.

Figure 4:
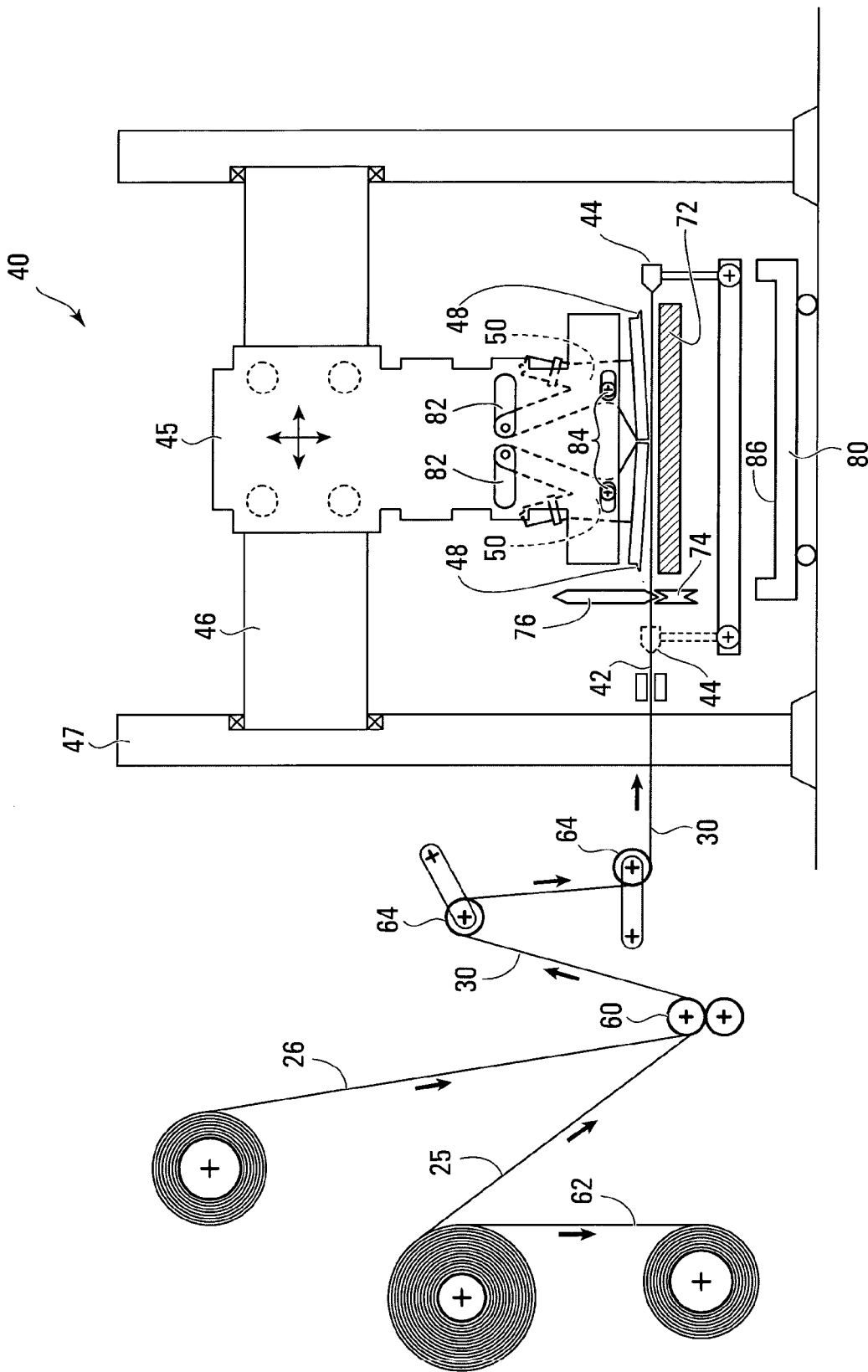
FIG. 4 is a schematic front elevational view of a stacking apparatus according to one embodiment of the invention.

FIG. 4 illustrates schematically a stacking apparatus 40 adapted to handle a continuous length of pre-assembly 30, cut the pre-assembly 30 to length and stack the cut lengths of the pre-assembly 30 to form an electrochemical cell 10. In a preferred embodiment, a continuous length of half-cell 25 is brought together with a lithium metal anode sheet 26 on an assembly roll 60 which presses the lithium metal anode sheet 26 onto the half-cell 25 to form the pre-assembly laminate 30. Once the lithium metal anode sheet 26 is assembled to one side of the half-cell 25, one side of the pre-assembly electrochemical laminate 30 is live and by definition charged and voltage measurements may be taken to ensure that no short-circuits occurred in the assembly. As illustrated, when the continuous half-cell 25 is unrolled, a protective polypropylene sheet 62 is removed. The pre-assembly laminate 30 is wound through a series of cylindrical rolls 64 adapted to maintain the pre-assembly laminate 30 under a pre-determined tension and brought to the stacking apparatus 40.

In a one specific embodiment, the stacking apparatus 40 comprises a stacking head 45 slideably mounted on a upper girder 46 itself mounted on a fixed supporting structure 47 and adapted to move forward and backward on the fixed supporting structure 47. The stacking head 45 is adapted to move sideways and vertically relative to the girder 46. In combination with the forward and backward movement of the girder 46, the stacking head 45 is adapted to move along all three axes X, Y and Z. The movements of the stacking head 45 along the various axes are effected by sliding or rolling connections and are powered by any means know to the person skilled in the art, for example by pneumatic, hydraulic or precision electric motors. All through the assembly process, the movements of stacking head 45 are controlled precisely by a positioning system of coordinates X, Y and Z. The stacking head 45 comprises a pair of holding members 48 adapted to securely hold pre-assembly laminate 30 without damaging its fragile layers. Each holding member 48 is mounted onto a rotating bracket 50 rotatably mounted on the stacking head 45 through a slot system 82, 84. The rotating brackets 50 are adapted to control the angular positions of each holding member 48 relative to one another and relative to the horizontal axis. A mechanical, hydraulic or pneumatic system (not shown) controls the rotation of rotating brackets 50 and therefore the angular positions of each holding member 48.

As illustrated in FIGS. 5A and 5B, holding members 48 consists of a flat or curvilinear plate 52 made of a micro-porous material compatible with lithium which means that it does not adhere to the lithium sheet 26. The upper portion of plate 52 comprises a vacuum chamber 56 that is connected through the rotating brackets 50 to a pneumatic vacuum system, via a conduit 58. In operation, the vacuum system generates a vacuum within vacuum chamber 56, which in turn generates a negative pressure on the lower surface 70 of plate 52 through the micro-pores or capillaries of the micro-porous material such that the holding member 48 can lift and securely hold the pre-assembly laminate 30. The micro-pores of the material ensures that the pre-assembly laminate 30 and more specifically the upper lithium sheet 26 will not be damaged by the vacuum force applied thereto. If plate 52 comprised a series of small apertures through which the vacuum force was applied, the lithium sheet 26 could be deformed to a mirror image of plate 52 which would be detrimental to the subsequent assembly of the electrochemical cell 10. The micro-pores are sufficiently small that the vacuum force does not affect the surface of the lithium sheet 26.

Referring back to FIG. 4, in operation, an end 42 of the continuous length of pre-assembly laminate 30 is gripped by a pincer 44 having soft jaws with flat surfaces which then pulls a pre-determined length of the pre-assembly laminate 30 into position in front of stacking head 45 and onto a smooth surface 72 located immediately in front of stacking head 45. Aligned with the end of surface 72, a rotary knife 76 and anvil 74 assembly is provided. Rotary knife 76 and anvil 74 are adapted to move together perpendicular to the end of surface 72 to effectively cut the pre-assembly laminate 30 to its pre-determined length. In operation, the stacking head 45 is moved forward over pre-assembly laminate 30 and surface 72 and is lowered onto the pre-assembly laminate 30 which it holds securely onto surface 72 while the rotary knife 76/anvil 74 assembly is rolled onto the pre-assembly laminate 30 to cut the pre-assembly laminate 30 to a pre-determined length. Thereafter, the stacking head 45 lifts the cut pre-assembly 30 using the negative force generated on the lower surface 70 of holding members 48 by the vacuum system through vacuum chamber 56.

Stacking head 45 is then moved forward and is positioned over a carriage platform 80. The surface 86 of the carriage platform 80 is treated with plasma deposition to prevent the pre-assembly laminate 30 from sticking to it. Stacking head 45 then moves down and deposits the pre-assembly laminate 30 onto the carriage platform 80 to form the first layer of the electrochemical cell 10. Stacking head 45 then moves back to its initial position where the cycle previously described is repeated. A second pre-assembly laminate 30 is deposited onto the previously laid pre-assembly laminate 30 to form a complete bi-face electrochemical laminate 12 as illustrated in FIG. 2. The cycle is repeated until a predetermined number of electrochemical laminates are assembled to form an electrochemical cell 10. The carriage platform 80 is then moved to another station (not shown) for further processing; an empty carriage platform 80 is positioned in its place and the entire cycle is repeated for assembling a new electrochemical cell 10.

FIG. 6 illustrates the various positions holding members 48 assume at various points during the assembly cycle. FIG. 6a illustrates the position of the holding members 48 when stacking head 45 is lowered onto the pre-assembly laminate 30 to hold it securely onto surface 72 while it is being cut to the pre-determined length. The holding members 48 form between them a substantially flat surface with an angle of approximately 180°. At this stage, the vacuum system is turned on which generates a negative pressure at the surface 70 which enables holding members 48 to gently lift the cut length of laminate 30. Thereafter, the holding members 48 assume the position illustrated in FIG. 6b, where the rotating brackets 50 are rotated inwardly such that the holding members 48 form between them an angle of less the 180° and the pre-assembly laminate 30 assumes a somewhat angular or curvilinear shape. The rotating brackets 50 are pivoted or rotated via precisely shaped slots 82 and 84 to prevent the surfaces 70 of the holding members 48 from moving marginally away from each other and creating a pulling force on the pre-assembly laminate 30 that could rip or damage it. The pre-assembly laminate 30 is carried to a position above the carriage platform 80 onto which another pre-assembly laminate 30 has been previously laid down. The stacking head 45 lowers the pre-assembly laminate 30 onto the previously laid component in this angular or curvilinear position such that the central or middle portion of laminate 30 touches the previously laid component first. The rotating brackets 50 are then rotated outwardly as shown in FIG. 6c, in order to lower and at the same time spread the remainder of the pre-assembly laminate 30 onto the previously laid component thereby driving out air and preventing air entrapment between the components during assembly. Simultaneously, the negative pressure is released from vacuum chambers 56 to release the pre-assembly 30 while it is being spread onto the previously laid component. Stacking head 45 then moves back to its initial position where the entire cycle previously described is repeated until the pre-determined number of electrochemical laminates are assembled to form an electrochemical cell 10. When the predetermined number of assembled electrochemical laminates is reached, the carriage platform 80 is moved away and replaced with an empty one and the assembly cycle begins again.

Stacking apparatus 40 is shown and described with a single stacking head 45; however, a plurality of stacking heads 45 may be installed side by side in the supporting structure 47 such that a plurality of electrochemical cells 10 may be assembled simultaneously. In this embodiment, there are as many rotary knife 76/anvil 74 assemblies as there are stacking heads 45. The continuous length of pre-assembly laminate 30 is gripped by the pincer 44 and pulls a pre-determined length of the pre-assembly laminate 30 into position in front of the plurality of stacking heads 45 and onto a plurality of aligned smooth surfaces 72 located immediately in front of each of the plurality of stacking heads 45. One rotary knife 76/anvil 74 assembly is positioned adjacent each of the plurality of stacking heads 45. In operation, the stacking heads 45 are then moved forward over the length of pre-assembly laminate 30 and are lowered onto the pre-assembly laminate 30 which it holds securely onto surfaces 72 while the rotary knife 76/anvils 74 assemblies are rolled onto the pre-assembly laminate 30 adjacent each stacking head 45 to cut the pre-assembly laminate 30 to pre-determined lengths. Thereafter, the stacking heads 45 lift their respective portion of the cut pre-assembly laminate 30 as previously described and stack them onto a plurality of carriage platforms 80, one for each stacking head 45 in the same manner previously described. In this embodiment of the stacking apparatus 40, the movements of the plurality of stacking heads 45 are also controlled precisely by a positioning system of coordinates X, Y and Z throughout the assembly process.

Although the present invention has been described in relation to particular variations thereof, other variation and modifications are contemplated and are within the scope of the present invention. Therefore the present invention is not to be limited by the above description but is defined by the appended claims.

We claim:

1. A stacking apparatus for assembly of electrochemical cells comprising:
   a supporting structure;
   at least one stacking head operative to stack a plurality of electrochemical laminates of a pre-determined length one on top of the other, said stacking head having at least one adjustable holding member adapted to hold a particular one of the electrochemical laminates and having means for adjusting the shape of the particular one of the electrochemical laminates, said at least one adjustable holding member being operative during stacking to hold the particular one of the electrochemical laminates in a shape such that a central portion of the particular one of the electrochemical laminates is deposited first and to subsequently move so as to progressively lower the remainder of the particular one of the electrochemical laminates, thereby preventing air entrapment between adjacent ones of the electrochemical laminates being stacked.

2. A stacking apparatus as defined in claim 1, wherein said at least one adjustable holding member includes a vacuum system for generating a negative pressure for holding the particular one of the electrochemical laminates.

3. A stacking apparatus as defined in claim 2, wherein said at least one adjustable holding member includes a plate made of a micro-porous material, said vacuum system being operative for generating the negative pressure through said plate.

4. A stacking apparatus as defined in claim 3, wherein said at least one adjustable holding member includes a vacuum chamber positioned adjacent said plate of micro-porous material.

5. A stacking apparatus as defined in claim 1, further comprising mechanical cutting means adjacent said stacking head and adapted to cut a continuous length of electrochemical laminate to said pre-determined length.

6. A stacking apparatus as defined in claim 5, wherein said mechanical cutting means includes a rotary knife.

7. A stacking apparatus as defined in claim 1, wherein said at least one stacking head includes two adjustable holding members rotatably mounted onto said at least one stacking head.

8. A stacking apparatus as defined in claim 7, wherein said two adjustable holding members are rotatably mounted through a slot system for guiding the rotational movement of said two adjustable holding members, thereby preventing damage to the particular one of the electrochemical laminates.

9. A stacking apparatus as defined in claim 1, wherein said at least one stacking head is movable vertically and horizontally within said supporting structure.

10. A stacking apparatus as defined in claim 1, comprising a plurality of stacking heads mounted side by side on said supporting structure such that a plurality of electrochemical cells may be assembled simultaneously.

11. A stacking apparatus as defined in claim 1, further comprising a treated surface for stacking thereon the plurality of electrochemical laminates of the pre-determined length.

12. A stacking apparatus as defined in claim 1, further comprising at least one carriage platform having a treated surface for stacking thereon the plurality of electrochemical laminates of the pre-determined length.

* * * * *